United States Patent Office 3,309,161
Patented Mar. 14, 1967

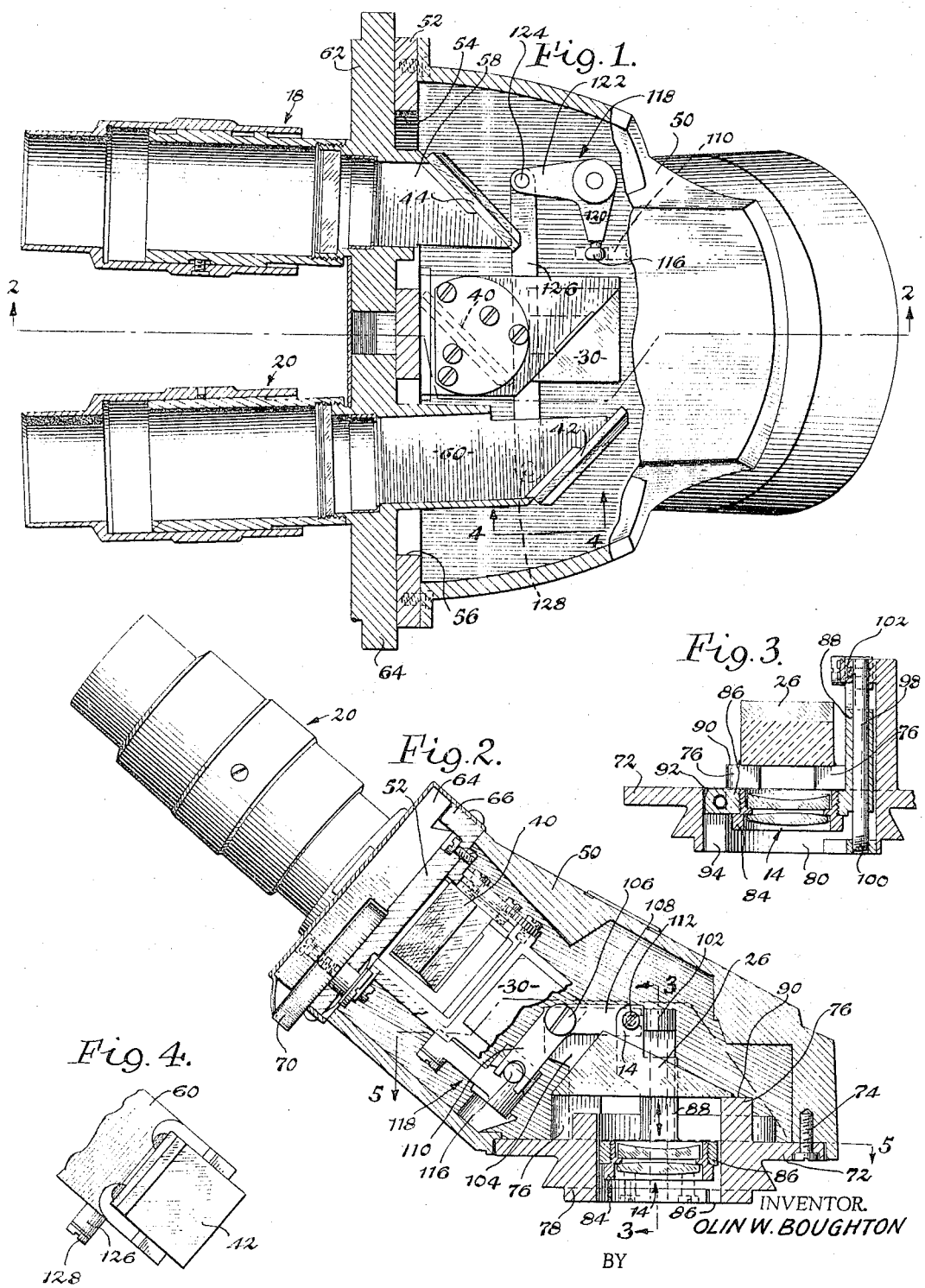

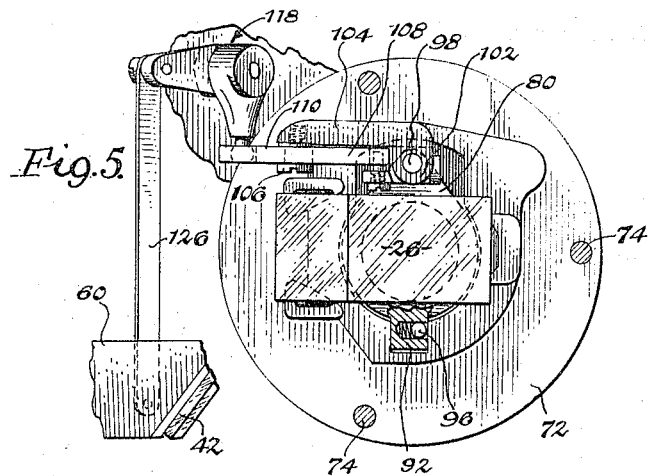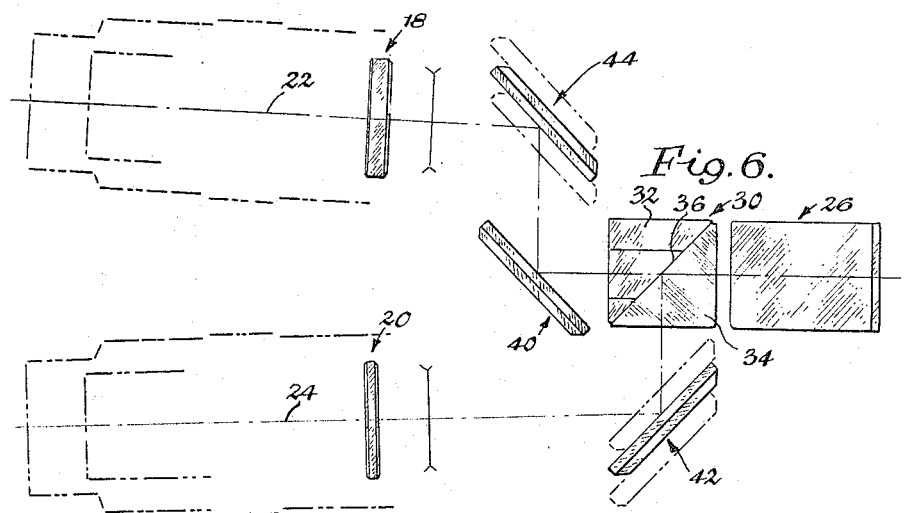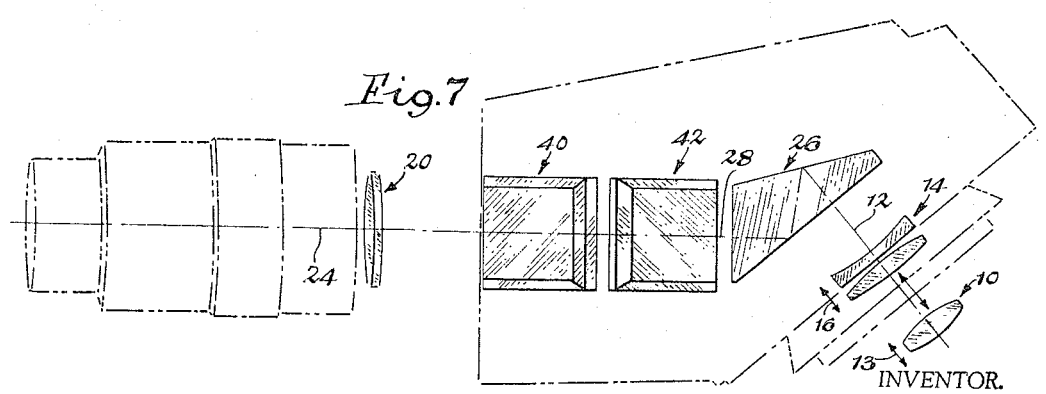

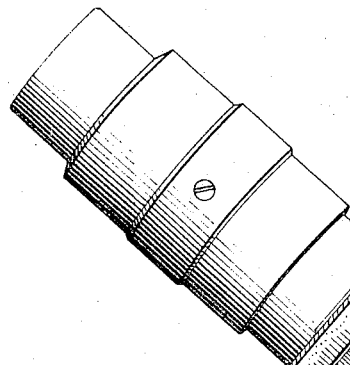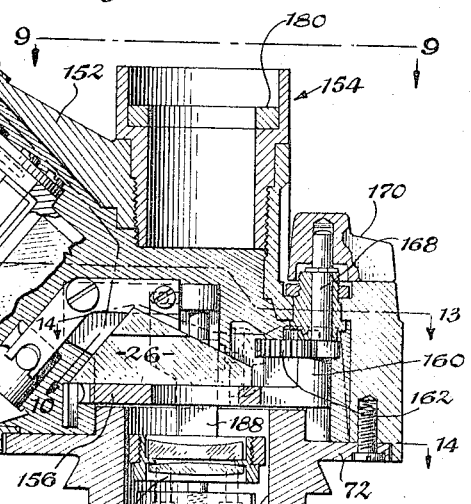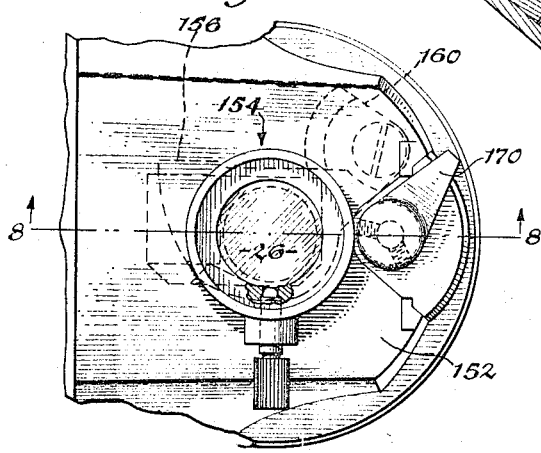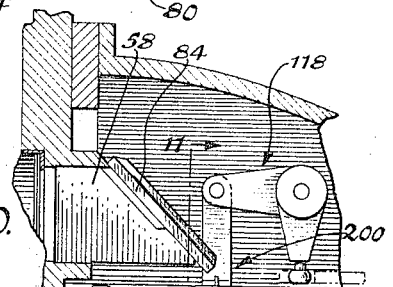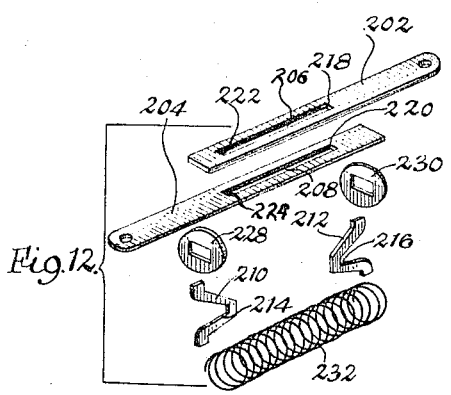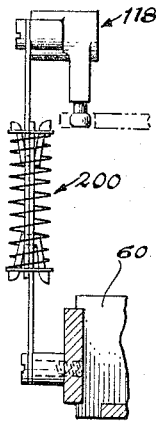

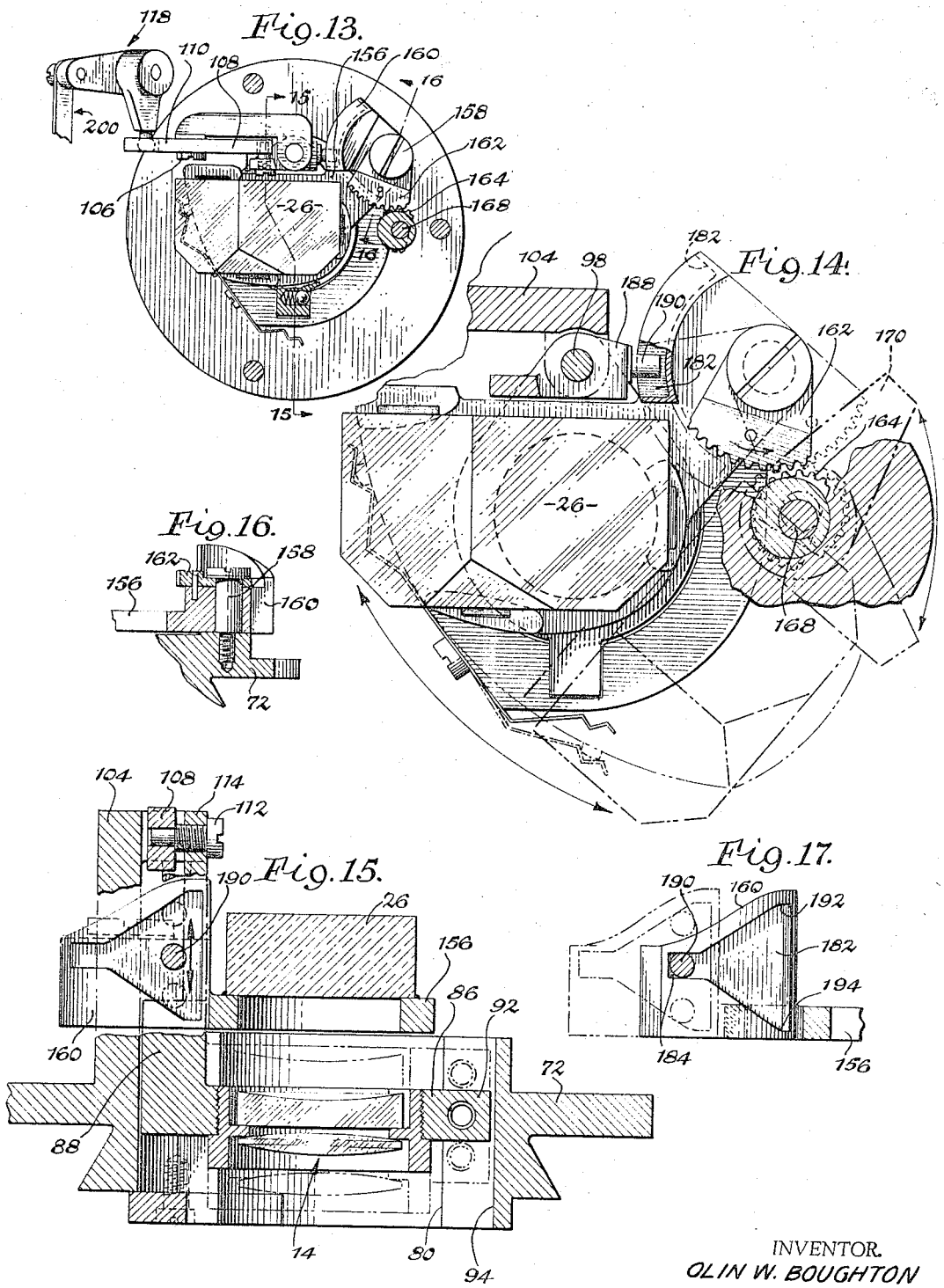

3,309,161
VARIABLE INTERPUPILLARY DISTANCE
BINOCULAR MICROSCOPE WITH FO-
CUS COMPENSATION
Olin W. Boughton, Williamsville, N.Y., assignor to American Optical Company, Southbridge, Mass.
Filed Feb. 19, 1963, Ser. No. 259,670
4 Claims. (Cl. 350—35)

This invention relates to microscopes in general and pertains, more particularly, to certain improvements in the construction of microscopes of the binocular type.

In a binocular type microscope, that is, one utilizing two oculars or eyepieces, it is customary to provide some means for varying the interpupillary spacing between the eyepieces such as may be required for accommodation to different users of the microscope. With such an arrangement utilized in conjunction with a beam-splitting system, such interpupillary distance variation or adjustment throws the system out of focus. With such an arrangement, therefore, some provision must be made to simultaneously provide for refocusing of the eyepieces as their interpupillary distance is changed or some other compensatory focusing adjustment must be achieved if the system is to avoid the necessity for refocusing. That is to say, to maintain a parfocal system, some focusing adjustment must be accomplished in coordination with interpupillary spacing variation between the eyepieces. Whereas this relationship is broadly old, it usually requires a considerable degree of mechanical complexity and also inherently provides, in the construction, a considerable degree of delicacy. Consequently, it is of primary concern in connection with the present invention to provide an improved microscope construction generally as aforesaid wherein focusing compensation is accomplished in a relatively simple fashion and with such means and construction as is inherently rugged, reliable, safe and economical.

A further primary object of the present invention resides in the provision of an improved optical system including a pair of eyepieces, a microscope objective means and telescope objective means wherein the microscope objective means is independently movable for focusing upon an object and wherein the object so focused upon is imaged substantially at infinity, the telescope objective means being interposed optically between the microscope objective means and the eyepieces to focus the image in the focal planes of the eyepieces and wherein the telescope objective means is also independently movable, relative to the microscope objective means, in accord with interpupillary distance distance variations between the eyepieces for establishing the parfocality of the system. Additionally, such a system can utilize the principles according to copending application Serial No. 114,694 filed June 5, 1961, now Patent No. 3,132,200, issued May 5, 1964, obtained by virtue of the combination of the microscope-telescope objective relationship for obtaining improved optical characteristics of the system.

Another object of this invention is to provide an improved microscope construction as aforesaid wherein means is utilized to incline the axes of the eyepieces relative to the optical axis between the telescope and microscope objectives whereby clearance is provided for the addition of camera mounting means which is aligned along the axis between the telescope and microscope objectives, the inclining means being movable outside the optical region and connected to the telescope objective for moving the same to a predetermined position establishing the correct focused relationship between a camera accommodated by the mounting means therefor, the telescope objective and the microscope objective.

Essentially, then, the present invention is primarily directed to an improved microscope system wherein variations in the interpupillary distance spacing between the eyepieces of a binocular type of microscope is accommodated for by maintaining the system at parfocality by the expedient of obtaining coordinated movement of a telescope objective and, additionally, the present invention envisages such a system wherein a predetermined position of the telescope objective is established upon manipulation of the mechanism for utilization in association with an accessory such as a camera.

Other objects and advantages of the invention will appear from the description hereinbelow and the accompanying drawing wherein:

FIG. 1 is a plan view of an upper portion of a binocular type microscope with portions thereof broken away to illustrate details both of the optical system and of the mechanical system associated therewith;

FIG. 2 is a vertical section taken through the body as indicated by section line 2—2 in FIG. 1 and showing further details of the optical system and mechanical mechanism;

FIG. 3 is a vertical section taken through the assembly as indicated by section line 3—3 in FIG. 2 showing a portion of the telescope objective mounting and carrying means;

FIG. 4 is an internal end view of one of the eyepiece members and showing a linkage connection thereto;

FIG. 5 is an internal plan view taken along the direction of section line 5—5 in FIG. 2 illustrating more clearly the mechanical interconnection between one of the eyepieces and the telescope objective mounting and carrying means;

FIG. 6 is a plan view of a portion of the optical system of the microscope;

FIG. 7 is an elevational view of the optical system;

FIG. 8 is a view similar to FIG. 2 but illustrating a binocular type of microscope having a camera attachment;

FIG. 9 is a plan view as indicated by section line 9—9 in FIG. 8 illustrating the control means for the inclination prism to permit utilization of the camera mount;

FIG. 10 is an internal plan view taken along the direction of section line 10—10 in FIG. 8 showing details of the mechanical linkage;

FIG. 11 is a sectional view as indicated by section line 11—11 in FIG. 10 illustrating further details of the mechanical linkage;

FIG. 12 is an exploded perspective view of the extensible and contractible linkage member;

FIG. 13 is a view as indicated by section line 13—13 in FIG. 8 showing further details of the mechanism for swinging the inclination prism to one side;

FIG. 14 is an enlarged section taken along section line 14—14 in FIG. 8 illustrating in full and dotted line positions the two positions of adjustment of the inclination prism;

FIG. 15 is a vertical section as taken along section line 15—15 in FIG. 13 illustrating details of the telescope objective cam;

FIG. 16 is an enlarged section taken along section line 16—16 in FIG. 13; and

FIG. 17 is a diagrammatic view illustrating operation of the telescope objective cam.

Referring now more particularly to FIG. 7, the principles of a portion of the optical system according to the present invention will be readily appreciated. In this figure, the reference character 10 represents diagrammatically a microscope objective which is independently movable along the optical axis 12 as indicated by the arrow 13 in this figure. Spaced a substantial distance from this microscope objective 10 is the telescope objective 14 which, preferably, comprises a slightly separated doublet subbstantially as is shown and which telescope objective is also independently movable along the axis 12 as indicated by the arrow 16. As has been disclosed in copending application Serial No. 114,694, now Patent No. 3,132,200, issued May 5, 1964, by utilizing relatively widely separated microscope and telescope objectives 10 and 14 in which the microscope objective images an object substantially at infinity, focusing movement of the optical system can be achieved by movement of the microscope objective 10 alone while permitting the telescope objective 14 to be fixed or, at least, independent of any focusing movement of the microscope objective 10. Additionally, as has been disclosed in the aforesaid copending application, certain benefits of a purely optical nature may accrue from such combination of microscope-telescope objective. In the present invention, the microscope-telescope objective arrangement as aforesaid is utilized primarily as a means for freeing the telescope objective 14 for independent movement to establish parfocality regardless of the interpupillary spacing between the eyepieces of a binocular type of microscope. Additionally, if desired, the added optical benefits which may accrue from the microscope-telescope combination as aforesaid may be utilized.

With refrence to FIGS. 6 and 7 simultaneously, reference characters 18 and 20 indicate, diagrammatically, the two eyepieces of a binocular type microscope, the optical axes of which are indicated by reference characters 22 and 24 respectively. It is to be understood that the showing of the eyepieces 18 and 20 is purely diagrammatic, the lenses shown being positioned at that point at which the field lens of a conventional multi-lens eyepiece would be placed. The purpose of the telescope objective 14 is to converge the substantially parallel light coming from the microscope objective 10 in the focal planes of the eyepieces 18 and 20. An inclining prism 26 is utilized to deviate the optical axis 12 in a direction indicated by the reference character 28 for passage through a beam-splitting prism assembly indicated generally by the reference character 30 and which may comprise a pair of prism elements 32 and 34 having a semi-reflecting inner face at 36 so that substantially half the light is transmitted through the assembly 30 for impingement upon the mirror 40 while substantially the other half of the beam is reflected to impinge upon the mirror 42. Mirror 40 and its associated mirror 44 are utilized, as shown, to direct the light along the optical axis 22 of the eyepiece 18 whereas the mirror 42 is utilized in conjunction with the semireflective inner face 36 to direct the light along the optical axis 24 of the eyepiece 20. substantially as is shown and as will be well understood by those skilled in the art. As is standard practice, the optical axes 22 and 24 of the two eyepieces may be convergent and, as is also conventional, these two eyepieces are bodily movable toward and away from each other to vary the interpupillary spacing therebetween. Conventionally, the mirrors 44 and 42 are carried by the respective eyepieces 18 and 20 so that as the interpupillary distance is varied between the two eyepieces, the mirrors 42 and 44 move toward or away from each other, as the case may be, as is indicated in dot-dash lines in FIG. 6. Obviously, any such interpupillary distance variation will alter the length along the optical axes to the eyepieces 18 and 20 so that, if the microscope objective 10 is focused for a given interpupillary distance, and the interpupillary distance is then changed, the system will be thrown out of focus. To compensate for this variation along the optical axes, the telescope objective 14 is moved in coordination with and in a mode related to the interpupillary variation between the two eyepieces 18 and 20. Thus, if the interpupillary distance is increased, the telescope objective 14 is moved away from the microscope objective 10, and vice versa. Thus, by properly coordinating the interpupillary distance variation between the eyepieces 18 and 20 and the movement of the telescope objective 14, parfocality will be obtained regardless of the particular interpupillary spacing. Furthermore, since, in the system as has been disclosed in connection with FIG. 7, the telescope objective 14 is free of any dependence upon the movement of the microscope objective 10 for initial focusing purposes, only the telescope objective 14 need be moved to accommodate and establish parfocality upon variation of the interpupillary distance between the eyepieces 18 and 20. This leads to great simplification in the mechanical construction of the device as hereinafter more particularly set forth and defined.

Referring now more particularly to FIGS. 1 and 2, a practical embodiment utilizing the principles as set forth hereinabove will be seen to consist of a body 50 having a hollow interior which mounts the telescope objective 14, the inclination prism 26, the beam-splitting assembly 30 and the directing mirrors 40–44. On the upper end of this body there is provided a mounting plate 52 having openings 54 and 56 or elongate slots therein through which project the extension 58 and 60 which serve to mount the respective mirror members 44 and 42 or their equivalent. These extensions 58 and 60 may be integrally formed or otherwise rigid with eyepiece carrier lates 62 and 64 which are slidably received in ways such as that indicated by reference character 66 in FIG. 2 formed or otherwise provided on the plate 52, the opposite side edges of each of the carrier plates 62 and 64 being undercut for proper engagement therewith, substantially as is shown. Any convenient method may be utilized for effecting the interpupillary variation between the eyepieces 18 and 20. In the form of the invention shown, a control knob 70 is mounted on the plate 52 with a portion of its circumference exposed as shown and the upper surface of this knob is provided with two eccentrically disposed points of pivotal connection for the inner ends of suitable connecting rods or links which extend therefrom for pivotal connection to the individual carrier plates 62 and 64. Alternatively, other and different types of drives may be utilized to effect the interpupillary variation in spacing the eyepieces 18 and 20.

On the lower end of the body 50 is provided a base plate 72 fixed thereto as by fasteners such as those indicated by reference character 74 and this base plate 72 includes an upstanding pedestal portion 76 upon whose upper surface the inclining prism 26 is mounted, substantially as is shown. The base plate 72 is provided with a depending boss portion 78 and a bore 80 extends through the pedestal and boss portion substantially as is shown for slidably carrying the telescope objective assembly 14. For this purpose, the telescope objective 14 is mounted in a cell assembly 84 which is screwthreaded or otherwise fixedly secured to a cell mounting member including the ring portion 86 having the upstanding leg 88 at one side thereof which projects upwardly through the bore 80 and above the upper surface 90 of the pedestal portion 76 upon which the inclining prism 26 is mounted. As is shown in FIG. 3, the pedestal portion 76 may be continuous or it may be formed discontinuously and of several sections 76 as are shown but, in any event, it provides either in its entirety or in its separate component parts, an upper mounting surface to which the inclining prism 26 is adhesively secured in a manner well known in the art. The cell mounting ring 86 is provided with a radial projection 92 received in a slot 94 intersecting the previously mentioned bore 80 and a suitable spring loaded ball member 96 may be provided to cooperate with the extension 92 as is shown in FIG. 5 to provide a good frictional engagement for vertical sliding movement of the extension 92 within the slot 94. As will be readily appreciated, the extension 92 is preferably diametrically opposed to the upstanding leg 88 of the mounting member for the telescope objective and this leg is provided with a bore therethrough receiving a guide post member 98 having its lower end 100 anchored in the base plate assembly 72 and having its upper end fixed within a bore in the overhanging extension portion 102 which is rigid also with the base plate 72. Thus, the guide rod 98 together with the extension 92 provide means whereby the mounting means for the telescope objective is positively and properly guided relative to the base plate 72.

As can be best seen in FIGS. 2 and 5, the upstanding support 104, of which the portion 102 forms a part extends laterally from such portion 102 and pivotally mounts thereon, as by means of a pivot member 106, a bell crank having end-slotted arm portions 108 and 110. The former of these arms receives, in its slotted end, a portion of a pin 112 carried by the upper end portion 114 of the leg 88 which is laterally jogged to clear the overhanging support 102, substantially as is shown in FIG. 2, and the latter of these arms 110 receives the end portion 116 of a further bell crank indicated generally by the reference character 118. As is shown in FIG. 1, the arm 120 of bell crank 118 engages the bell crank arm 110 whereas the other arm 122 of the bell crank 118 engages, at pivot connection 124, one end of a drag link member 126. The opposite end of the drag link member is pivotally connected, as at 128, to the extension 60 of the eyepiece 20, this relationship being more particularly set forth in FIG. 4. From the above, it will be apparent that as the eyepieces 18 and 20 are moved away from each other relatively, the telescope objective 14 will be caused to be moved vertically upwardly whereas opposite movement of the eyepieces will cause vertical downward movement of the telescope assembly 14. By properly correlating the relative motions of the two eyepieces as compared with the movements of the telescope objective 14, it will be readily apparent that parfocality may be obtained regardless of the particular interpupillary spacing between the eyepieces 18 and 20. The actual construction which is permitted by such an arrangement, as is shown in FIGS. 1 and 2, is characterized by its simplicity, ruggedness, and economy of construction, there being only two relative movements being involved, that establishes between the eyepieces proper and that established between the telescope objective and the base plate 72. The arrangement is substantially foolproof and lends itself readily to accurate coordination of the two movements involved so that parfocality is obtained without resort to any exotic mechanical movements or linkages such as is normally encountered in prior art arrangements achieving the same end results.

In the construction shown in FIG. 8, the body 152 is provided with a camera mounting sleeve indicated generally by the reference character 154 and which opens into the interior of the body 152 in alignment with the bore 80 in the base plate 72 and thus in alignment with the telescope objective 14. As will be evident, the inclining prism 26 normally obstructs proper operation of any camera or the like mounted in the assembly 154 so that, when a camera attachment is utilized, the inclining prism 26 must be moved out of its obstructing position. For this purpose, the inclining prism is mounted on a carrier plate 156 pivotally mounted as by a pin 158, see FIGS. 13 and 16, which is anchored to the base plate 72. This carrier plate 156 includes an enlarged cam portion 160 whose purpose will be presently apparent and fixed thereto is also a gear segment member 162 which meshes with a pinion or pinion segment or sector 164 fixed to the lower end of a pivot shaft 168 which projects upwardly therefrom to mount a control knob member 170 by means of which external manipulation for swinging movement of the carrier plate 156 and consequently the inclining prism 26 is effected.

The mounting assembly 154 is so constructed in its dimension that when a camera for example is properly positioned relative thereto as by being bottomed against the shoulder 180, the camera is fixed positionally relative to the optical system such that in a given or particular position of the telescope assembly 14, proper focus adjustment is achieved. Since the position of the telescope objective 14 may be different in any given instant than the proper position for parfocality of the system including the camera the cam 160 is utilized to properly orient and position the telescope objective 14 when the inclining prism 26 is moved to the unobstructing position. To accomplish this, the cam member 160 is provided with a cam slot as is shown in FIG. 17 having a relatively large mouth portion 182 and a narrow throat portion 184. The upstanding arm 188 of the carrier for the telescope objective 14 (see particularly FIG. 8) is provided with a laterally projecting pin 190 which is received in the cam slot substantially in the manner as is shown in FIG. 14. Thus, when the inclining prism 26 is moved to the unobstructed position as is illustrated in full lines in FIG. 14, the pin 190 will be disposed within the enlarged mouth portion 182 of the cam slot so that vertical motion of the telescope objective assembly may be affected between the limits of the upper and lower limiting surfaces 192 and 194 (see FIG. 17) of such mouth 182.

On the other hand, when the inclining prism 26 is moved to the unobstructing position, the pin 190 is constrained to move into the relatively narrow cam portion 184 and thus force the telescope objective to a particular and predetermined position as aforesaid.

To permit of this overriding control by the cam assembly, the drag link 200, see particularly FIGS. 10-12, which operates between the previously mentioned bell crank 118 and the apex extension 60, is of the extensible and contractible type. Although the details of this particular drag link 200 form no part of the present invention, in order to illustrate one type of mechanism which may be employed, it will be seen, from FIG. 12, that the drag link is actually composed of two link portions 202 and 204 provided with coextensive slots 206 and 208. The inner end portions of these two links are overlapped such that the slots 206 and 208, normally, are exactly aligned and the spring seat members 210 and 212 abut, at their crotches 214 and 216 against the corresponding aligned end portions 218, 220 and 222, 224 of the slots 206 and 208. The washers 228 and 230 form seats for the opposite ends of the spring 232 so that, in the absence of external forces, the links will seek a length in which the end portions 218, 220 and 222, 224 seat in the crotch portions 214, 216 as aforesaid. However, both extension and contraction of the linkage assembly 200 may be effected by the application of external overriding forces such as would occur when the telescope objective is forced to a position other than that in which it is properly positioned relative to the interpupillary distance between the eyepieces when the inclining prism 26 is swung to its unobstructing position as aforesaid.

It is to be understood that certain changes and modifications as illustrated and described may be made without departing from the spirit of the invention or the scope of the following claims.

1. In a microscope having a pair of eyepieces mounted for movement toward and away from each other for accommodation to different interpupillary distances,
   an optical system for focusing the image from a single objective in the focal planes of said eyepieces,
   said optical system including a telescope objective for receiving substantially parallel light from an objective and focusing same in the focal planes of said eyepieces, said telescope objective being mounted for movement along its axis, and a beam-splitting system for directing light from the telescope objective to the individual eyepieces, said beam-splitting system including light-deviating elements for presenting images to the respective eyepieces and movable therewith so that variations in the optical path length of the optical system occur by reason of the movement of said light-deviating elements,
   and means for simultaneously moving said telescope objective and said eyepieces to maintain the light from said telescope objective focused in the focal planes of said eyepieces.

2. In a microscope, in combination, a body, a pair of eyepieces mounted on said body for movement toward and away from each other for accommodation to different interpupillary distances, a telescope objective, a beam-splitting system optically interposed between said telescope objective and said eyepieces, said beam-splitting system including light-deviating elements for presenting images to the respective eyepieces and movable therewith so that variations in the optical path length of the optical system occur by reason of the movement of said light-deviating elements, said telescope objective being mounted on said body for movement along the optical axis of the telescope objective to image an object in the focal planes of said eyepieces, and means for moving said eyepieces as aforesaid, including mechanism connecting said eyepieces to said telescope objective for moving said telescope objective in coordination with said eyepieces to maintain the image of an object in the focal planes of said eyepieces.

3. In an optical system for microscopes, comprising, in combination, a pair of eyepieces mounted for variation of the interpupillary distance therebetween, microscope objective means for focusing upon an object and imaging the same substantially at infinity, an optical system including telescope objective means interposed optically between said microscope objective means and said eyepieces and a beam splitting system for presentation of an object image in the focal planes of said eyepieces, said beam-splitting system including light-deviating elements for presenting images to the respective eyepieces and movable therewith so that variations in the optical path length of the optical system occur by reason of the movement of said light-deviating elements, and means for simultaneously varying the interpupillary distance between said eyepieces and moving said telescope objective means along its optical axis to maintain an object image in the focal planes of said eyepieces.

4. In an optical system for microscopes, comprising, in combination, a pair of eyepieces mounted for variation of the interpupillary distance therebetween, microscope objective means for focusing upon an object and imaging the same substantially at infinity, an optical system including telescope objective means interposed optically between said microscope objective means and said eyepieces and a beam-splitting system for presentation of an object image in the focal plane thereof, said beam-splitting system including light-deviating elements for presenting images to the respective eyepieces and movable therewith so that variations in the optical path length of the optical system occur by reason of the movement of said light-deviating elements, inclination prism means disposed optically between said telescope objective means and said eyepieces whereby the optical axes of said eyepieces are inclined with respect to the optical axis between the telescope objective means and the microscope objective means, means connecting said eyepieces with said telescope objective for moving said telescope objective means in the optical axis direction thereof in response to interpupillary distance change between said eyepieces to retain an object image in the focal planes of the eyepieces, means for simultaneously moving said inclination prism means outside the optical system and said telescope objective means to a predetermined position, whereby an alternate optical path is established in which an object is imaged substantially at infinity, and camera mounting means for mounting a camera along said alternate optical path.

References Cited by the Examiner

UNITED STATES PATENTS 2,518,252 8/1950 Reardon et al.
2,735,337 2/1956 Frischmann _____ 88—39

DAVID H. RUBIN, *Primary Examiner.*